(12) United States Patent
Cox

(10) Patent No.: US 12,178,169 B1
(45) Date of Patent: Dec. 31, 2024

(54) PLANT GROWING SYSTEM

(71) Applicant: Tyler Cox, Westbury, NY (US)

(72) Inventor: Tyler Cox, Westbury, NY (US)

(*) Notice: Subject to any disclaimer, the term of this patent is extended or adjusted under 35 U.S.C. 154(b) by 29 days.

(21) Appl. No.: 18/209,738

(22) Filed: Jun. 14, 2023

(51) Int. Cl.
*A01G 9/02* (2018.01)
*A01G 9/24* (2006.01)
*A01G 9/26* (2006.01)
*A01G 27/00* (2006.01)

(52) U.S. Cl.
CPC .............. *A01G 9/023* (2013.01); *A01G 9/247* (2013.01); *A01G 9/249* (2019.05); *A01G 9/26* (2013.01); *A01G 27/005* (2013.01); *A01G 27/008* (2013.01)

(58) Field of Classification Search
CPC ........ A01G 9/021; A01G 9/023; A01G 9/249; A01G 9/247; A01G 9/26; A01G 27/005; A01G 27/006; A01G 27/008; A01G 27/02; A01G 31/02; A01G 2031/006
See application file for complete search history.

(56) References Cited

U.S. PATENT DOCUMENTS

| | | | | |
|---|---|---|---|---|
| 1,247,766 A | * | 11/1917 | White ...................... | A01G 27/04 47/81 |
| 3,743,372 A | * | 7/1973 | Ruggerone ............ | A47B 67/04 312/111 |
| 3,852,912 A | * | 12/1974 | Diller ...................... | A01G 9/028 47/84 |
| 4,226,048 A | * | 10/1980 | Molnar .............. | A01G 13/0281 47/81 |
| D742,784 S | | 11/2015 | Harms | |
| 9,526,333 B1 | * | 12/2016 | Nielson .............. | A47B 87/0292 |
| 10,477,786 B1 | * | 11/2019 | Wilson .................... | A01G 9/042 |
| 10,552,951 B2 | | 2/2020 | Barrasso | |
| 2015/0000190 A1 | | 1/2015 | Gibbons | |
| 2018/0184602 A1 | | 7/2018 | Pfir | |
| 2019/0191639 A1 | | 6/2019 | Hegyi | |
| 2019/0261589 A1 | * | 8/2019 | Pham ...................... | A01G 9/027 |
| 2020/0110933 A1 | | 4/2020 | Gionet | |
| 2021/0309269 A1 | | 10/2021 | Celan | |
| 2024/0000029 A1 | * | 1/2024 | Wantland ............... | A01G 31/06 |

FOREIGN PATENT DOCUMENTS

| | | | | |
|---|---|---|---|---|
| DE | 102015112568 A1 | * | 10/2015 | ............... A01G 9/02 |
| EP | 4098103 A1 | * | 12/2022 | ............. A01G 24/28 |
| WO | WO2020023504 | | 1/2020 | |

* cited by examiner

*Primary Examiner* — Ebony E Evans

(57) ABSTRACT

A plant growing system for growing plants in a controlled environment includes at least one cabinet assembly. Each of the at least one cabinet assembly a housing and a drawer which is removably positioned in the housing. At least one plant pot for holding a plant is positionable on a support tray which is positionable in the drawer. A light emitter is mounted in the housing and emits light toward the plant when activated.

8 Claims, 12 Drawing Sheets

PLANT GROWING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to plant growing system and more particularly pertains to a new plant growing system for growing plants in a controlled environment.

(2) Description of Related Art Including Information Disclosed Under 37 CFR 1.97 and 1.98

The prior art discloses myriad plant growing systems for growing plants in a controlled environment. However, the prior art does not disclose such a system in which plants are contained in pots that are removably positioned on a support tray which is removably positioned in a drawer that is movable alternately in and out of a housing. The prior art also fails to describe such a system with a reservoir positioned below the drawer for containing water which a pump draws from to water the plants, and which has draining structures to recycle water that hasn't been used by the plants. Lastly, the prior art fails to include such a system where a plurality of cabinets each made up of the components mentioned above are interchangeably stackable. Such systems are desirable as alternatives to the prior art which do not provide removable elements as described, do not incorporate a recycling watering mechanism, and are not interchangeably stackable to facilitate combining multiple cabinets together.

BRIEF SUMMARY OF THE INVENTION

An embodiment of the disclosure meets the needs presented above by generally comprising at least one cabinet assembly. Each of the at least one cabinet assembly comprises a housing, a drawer, a support tray, at least one plant pot, and a light emitter. The housing has an interior space positioned in the housing and a drawer opening extending through a front side of the housing to the interior space. A drawer is positioned in the interior space and is removable from the interior space through the drawer opening. A support tray is removably positioned in the drawer and at least one plant pot is removably positioned on the support tray. Each plant pot of the at least one plant pot is shaped such that each plant pot of the at least one plant pot is configured for containing a plant. A light emitter is configured to emit a light and is mounted in the housing and is oriented to direct the light toward the at least one plant pot.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
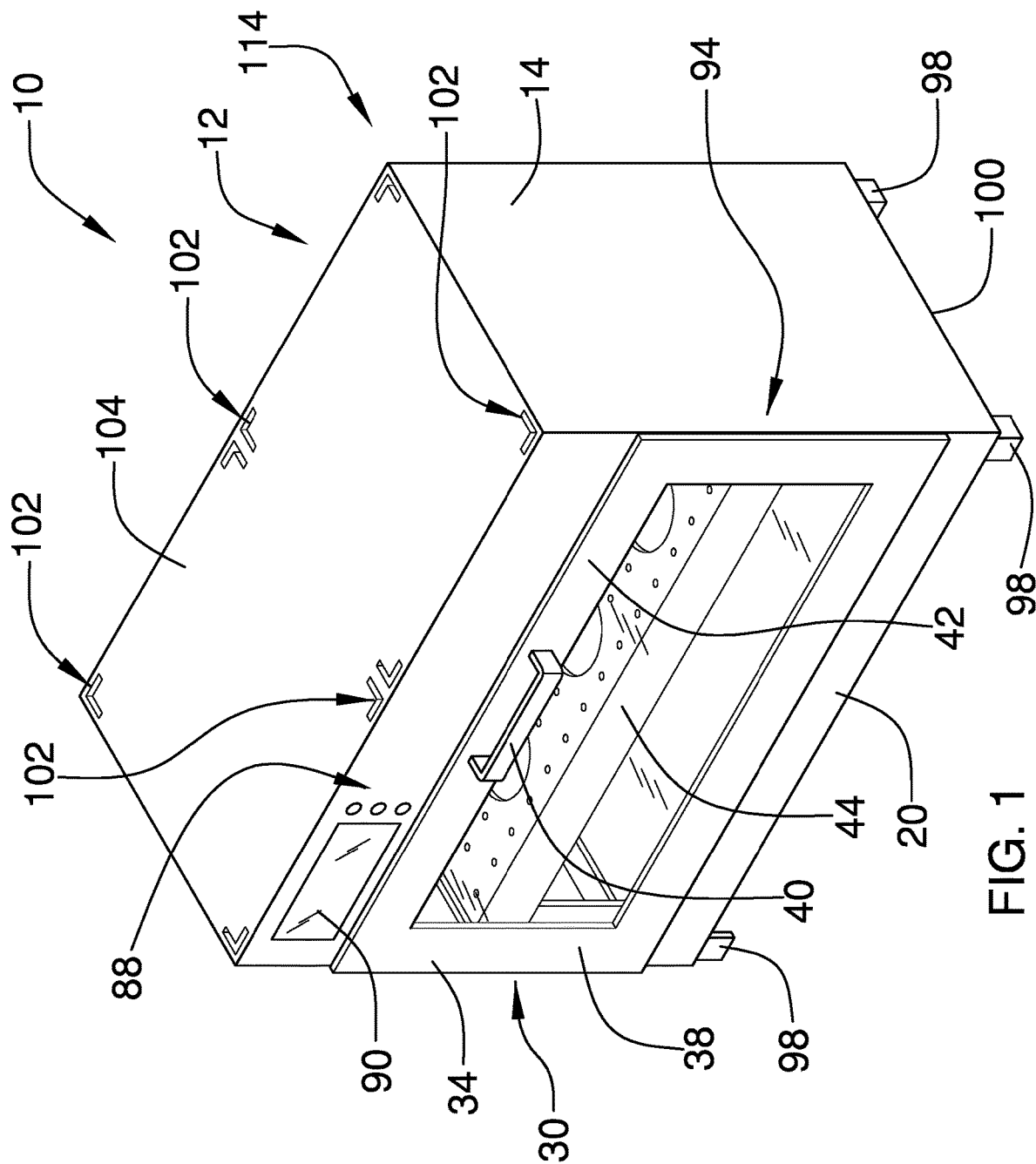
FIG. 1 is a top front side perspective view of a second-size cabinet of a plurality of cabinets of a plant growing system according to an embodiment of the disclosure.
Figure 2:
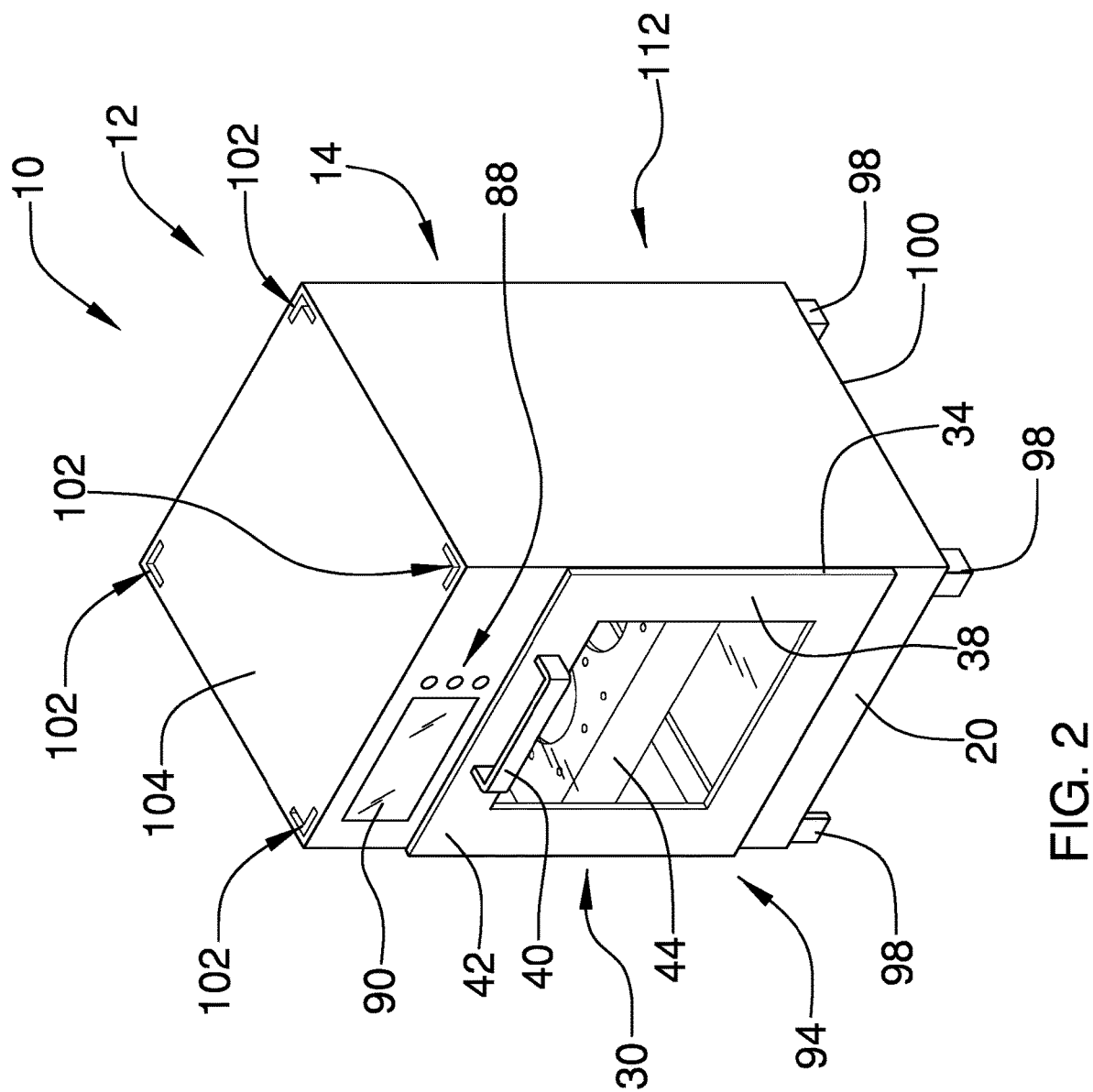
FIG. 2 is a top front side perspective view of a first-size cabinet of the plurality of cabinets an embodiment of the disclosure.
Figure 3:
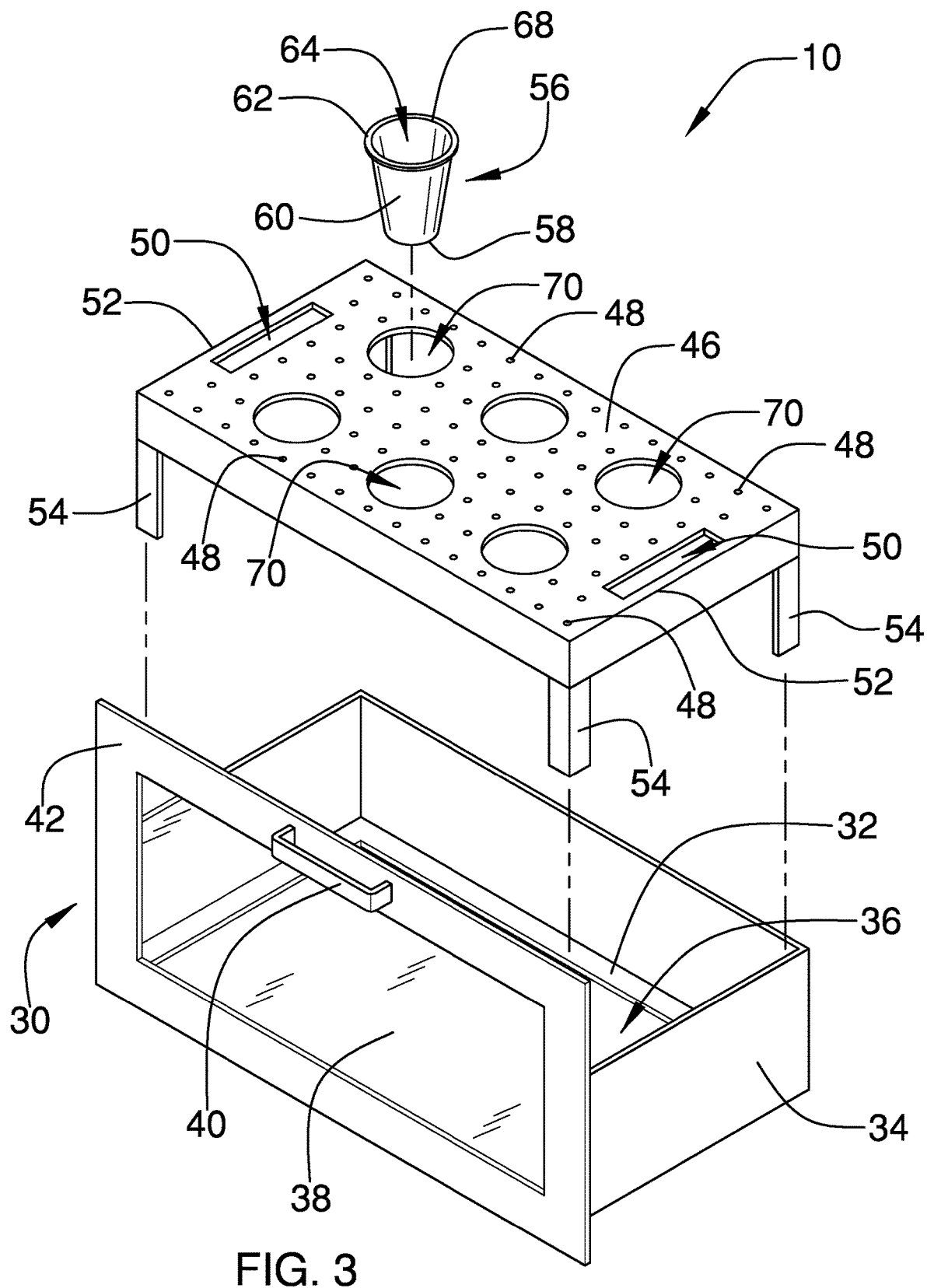
FIG. 3 is an exploded view of a drawer, a support tray, and a plant pot of the second-size cabinet of an embodiment of the disclosure.
Figure 4:
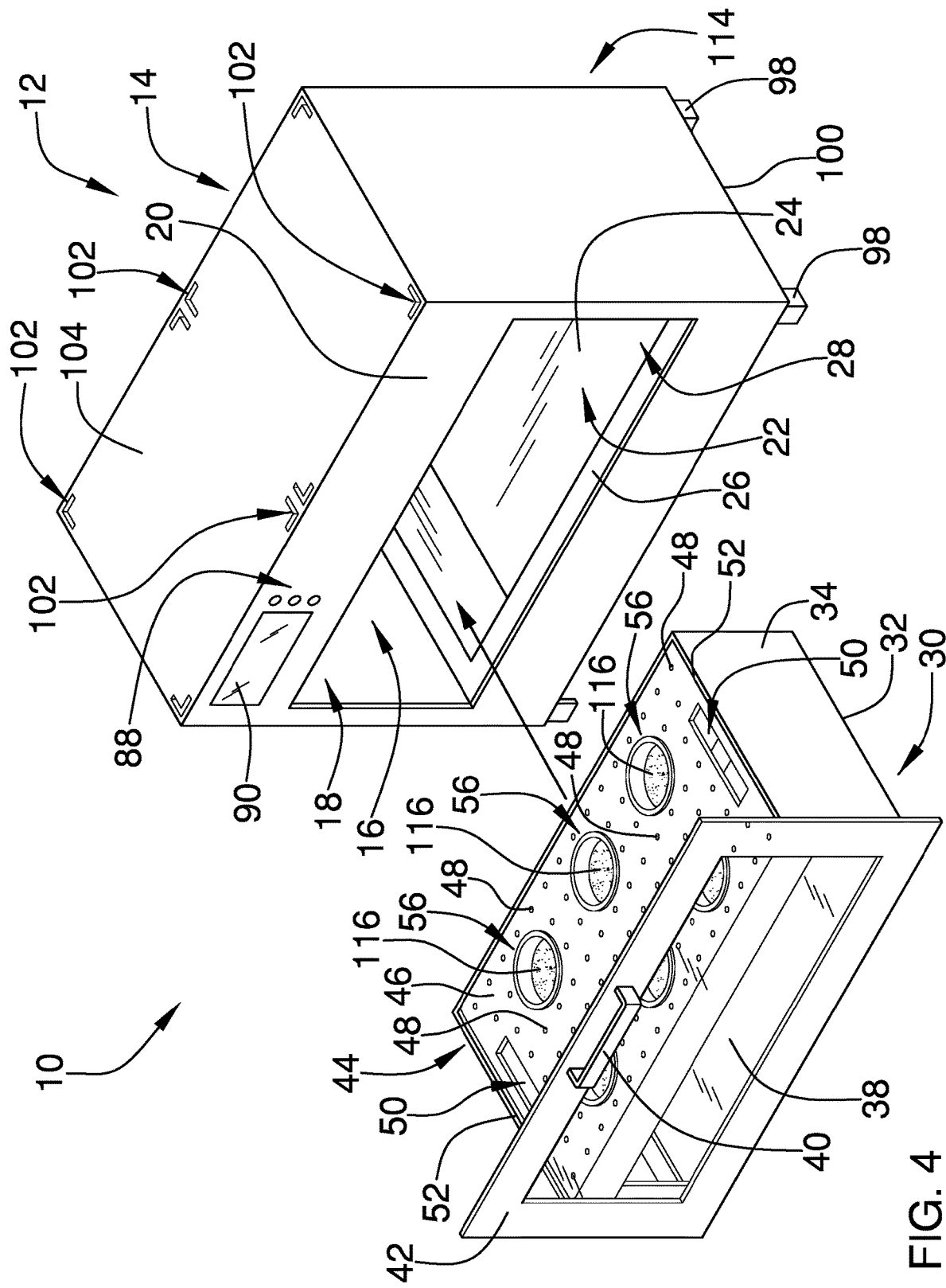
FIG. 4 is an exploded view of an exploded view of the second-size cabinet of an embodiment of the disclosure.
Figure 5:
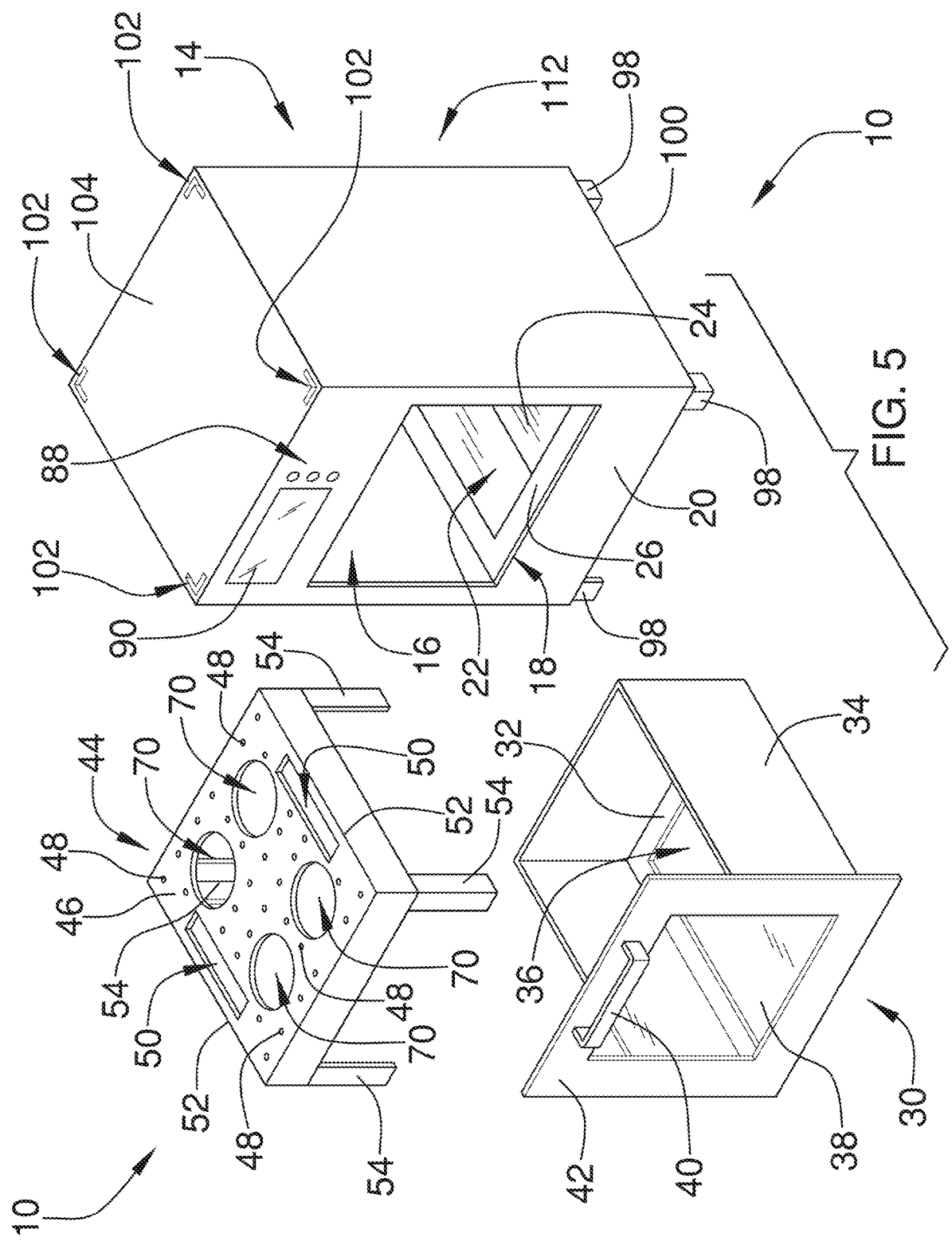
FIG. 5 is an exploded view of the first-size cabinet of an embodiment of the disclosure.
Figure 6:
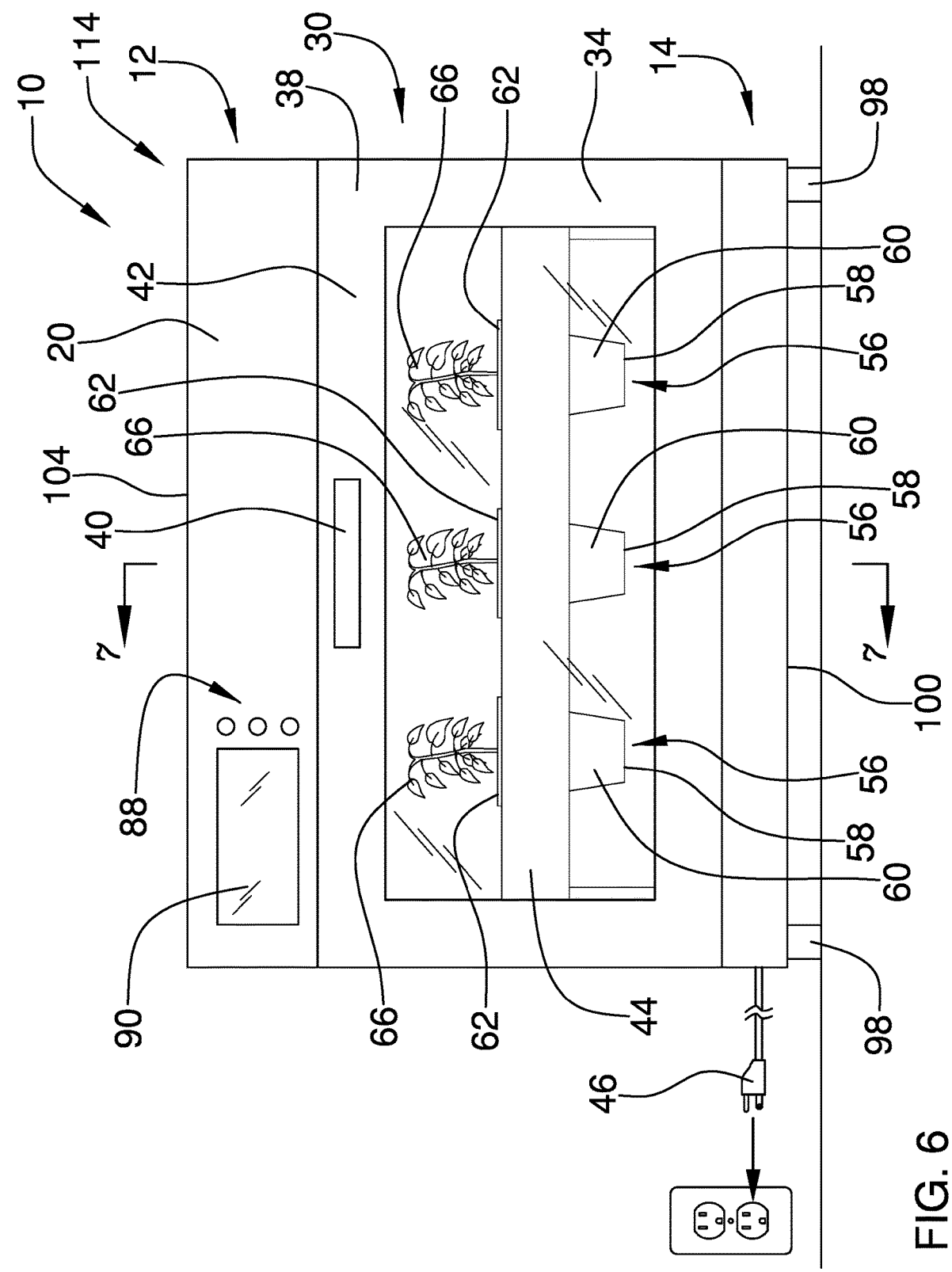
FIG. 6 is a front view of the second-size cabinet of an embodiment of the disclosure.
Figure 7:
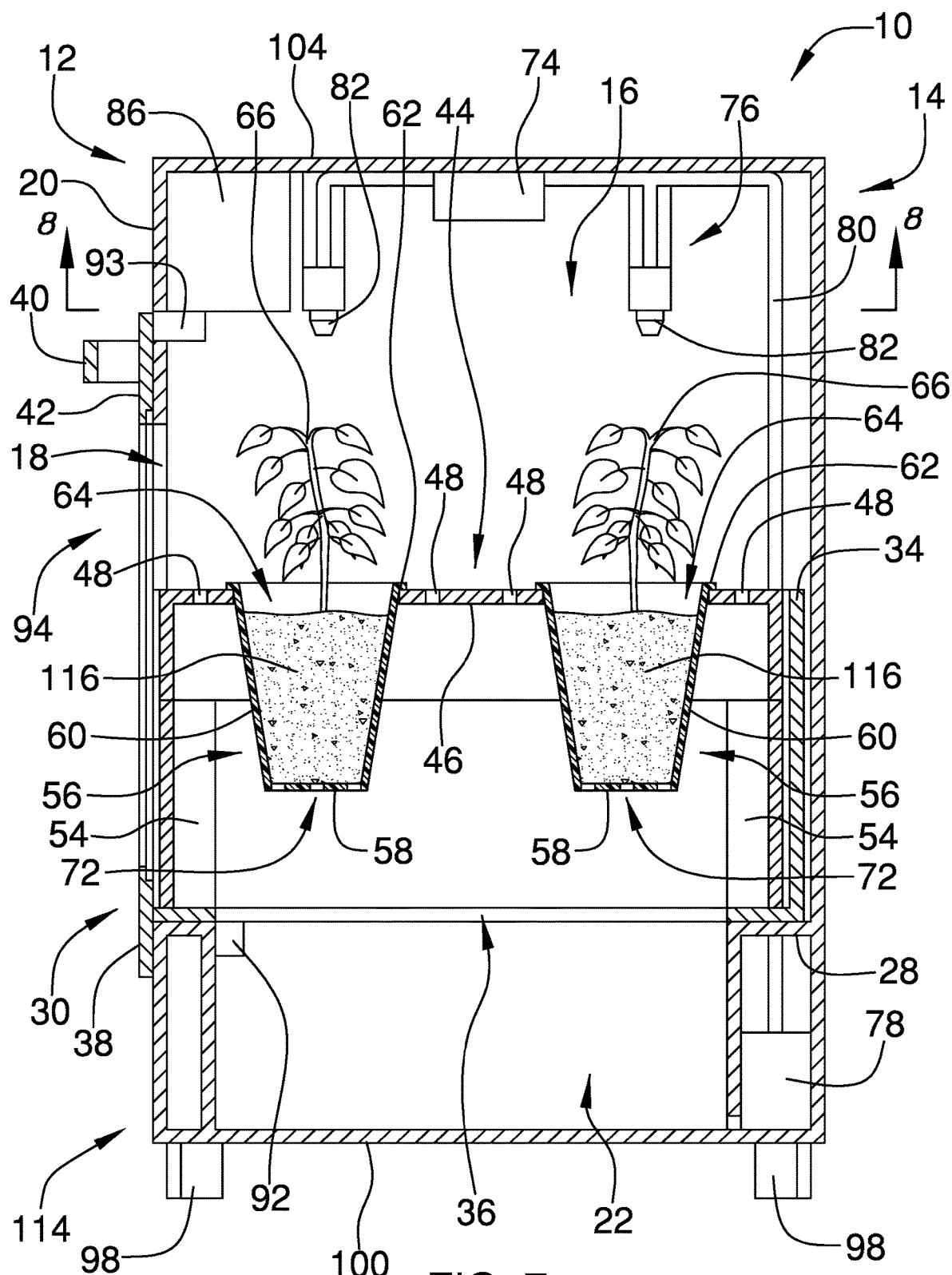
FIG. 7 is a cross-section view of the second-size cabinet of an embodiment of the disclosure taken from Arrows 7-7 in FIG. 6.
Figure 8:
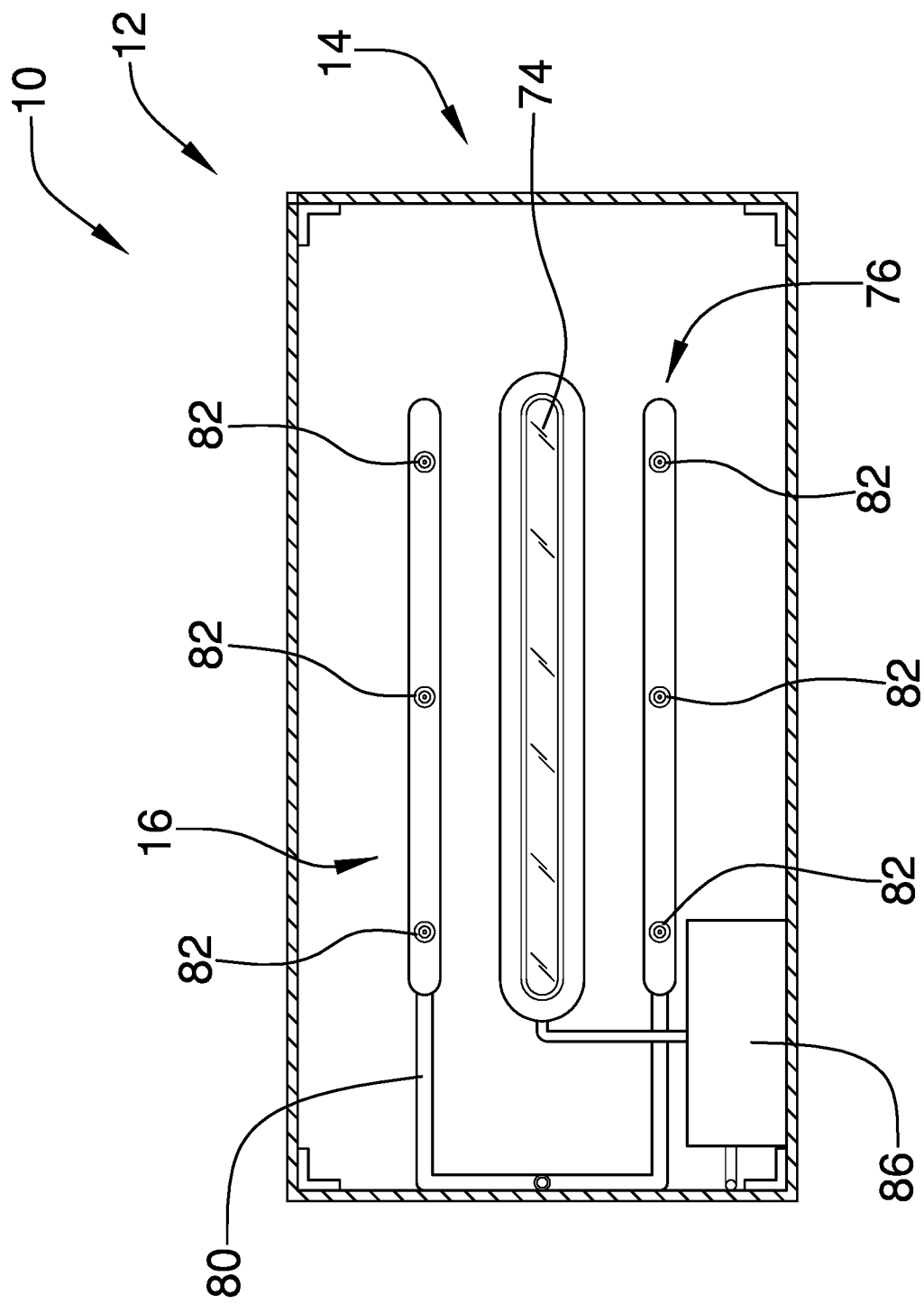
FIG. 8 is a cross-section view of the second-size cabinet of an embodiment of the disclosure taken from Arrows 8-8 in FIG. 7.
Figure 9:
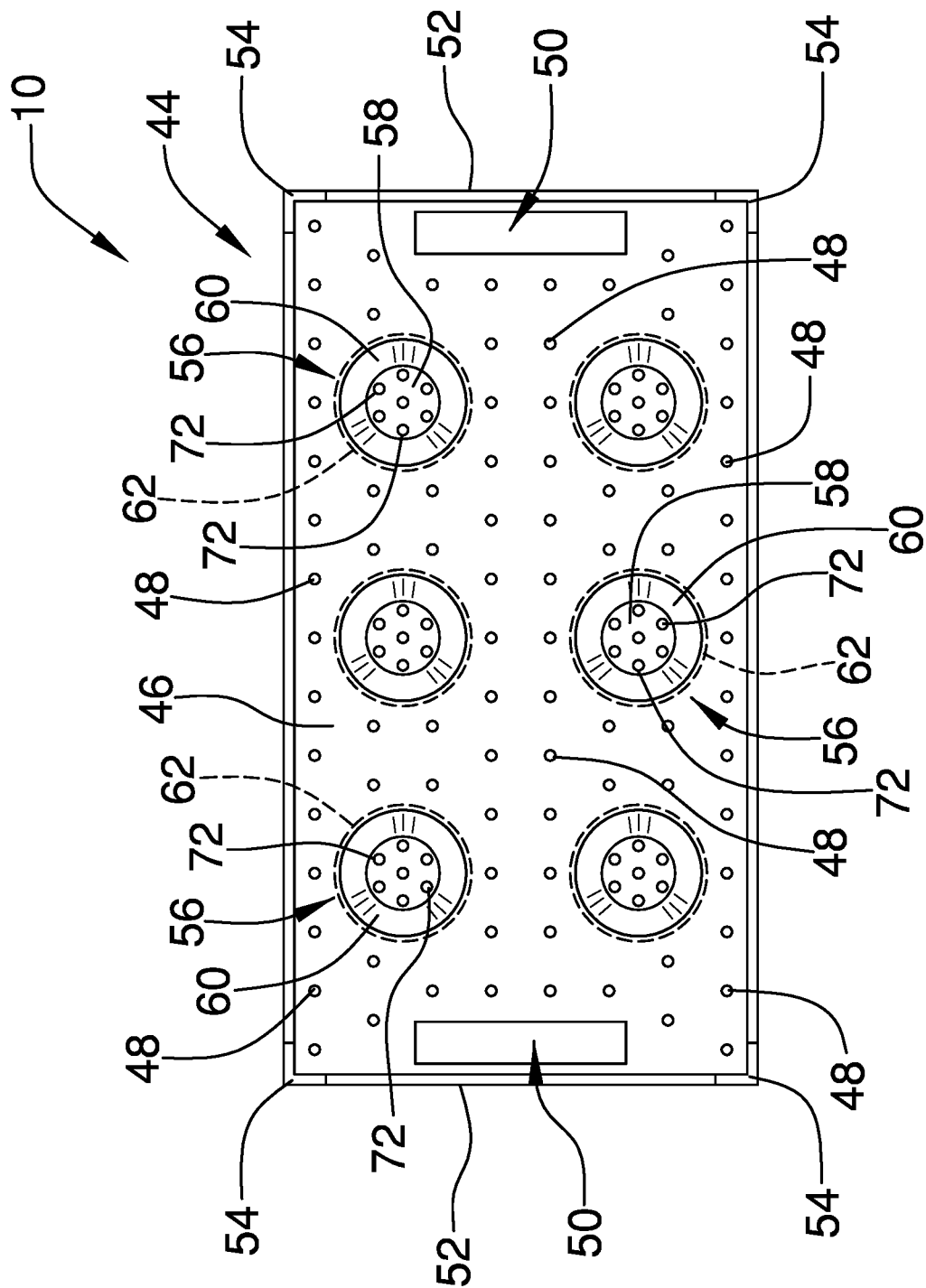
FIG. 9 is a bottom view of the support tray of the second-size cabinet of an embodiment of the disclosure.
Figure 10:
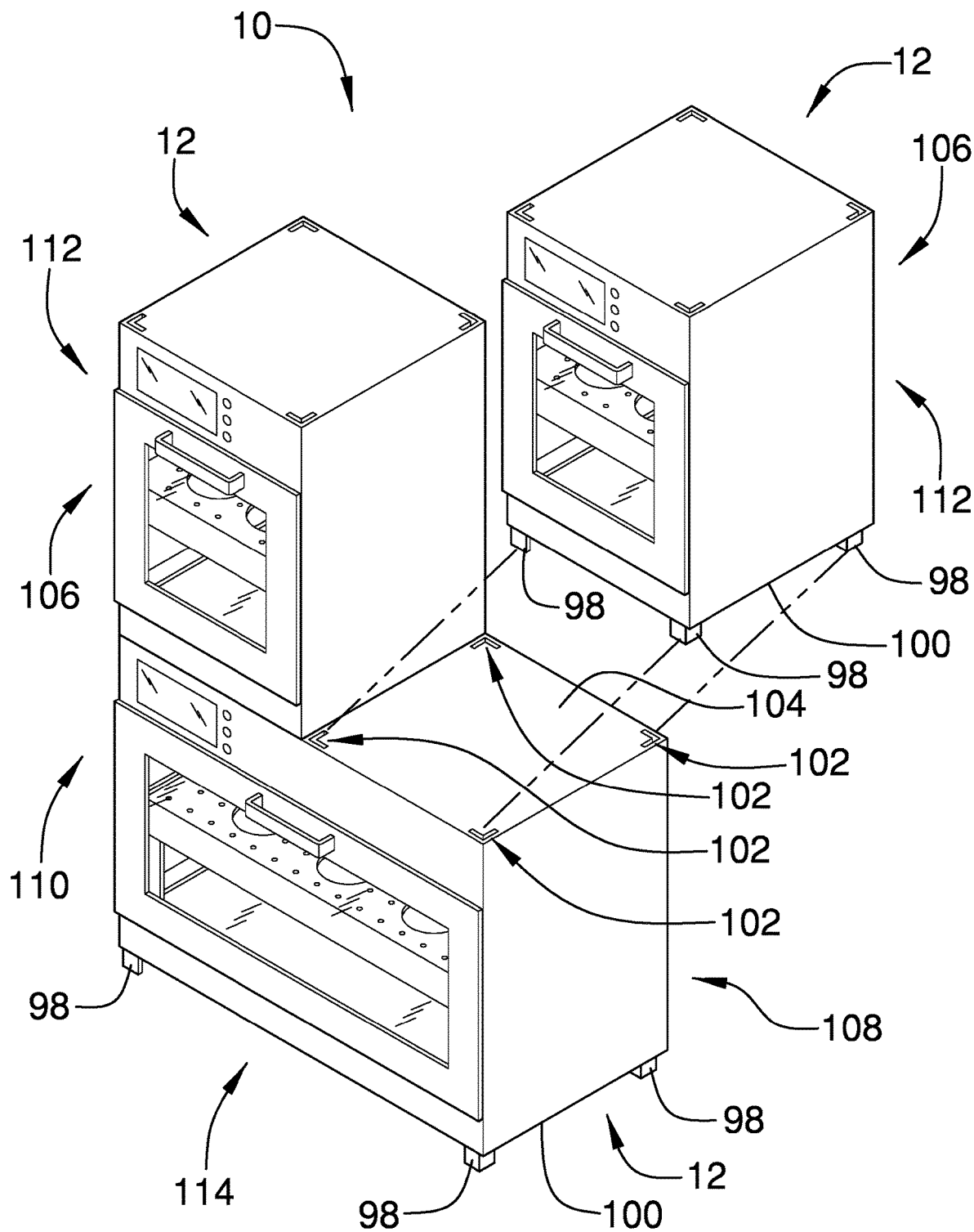
FIG. 10 is an exploded view of a pair of first-size cabinets in a stacked configuration with respect to the second-size cabinet of an embodiment of the disclosure.
Figure 11:
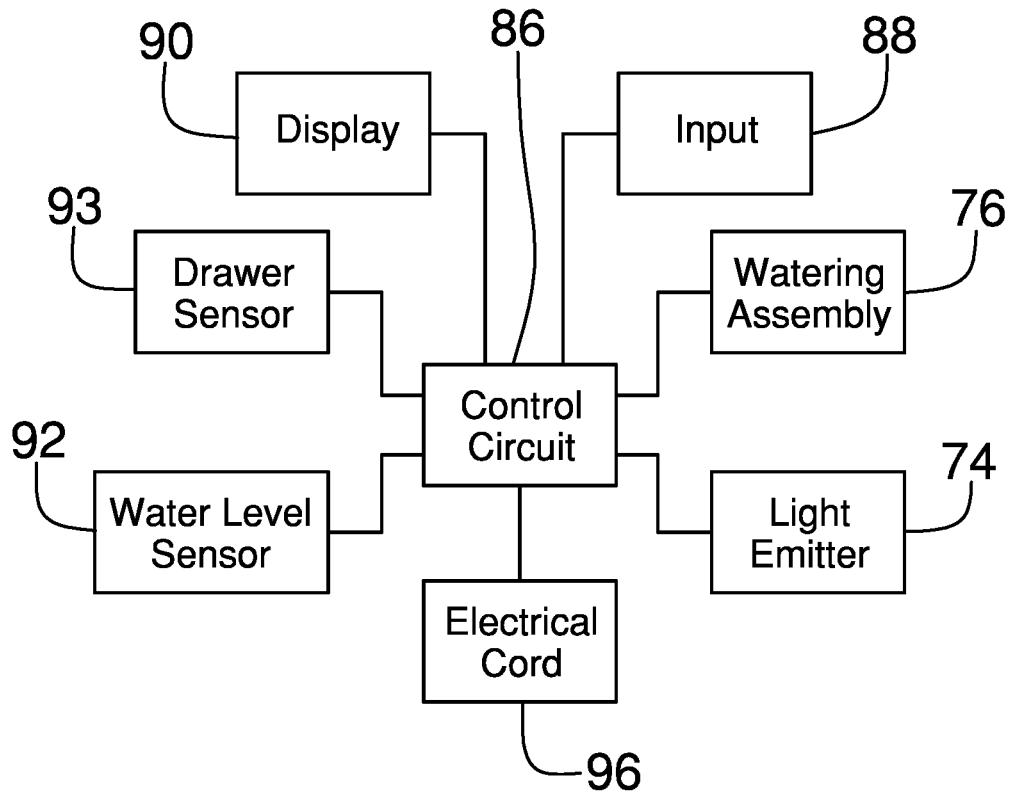
FIG. 11 is a block diagram of an embodiment of the disclosure.
Figure 12:
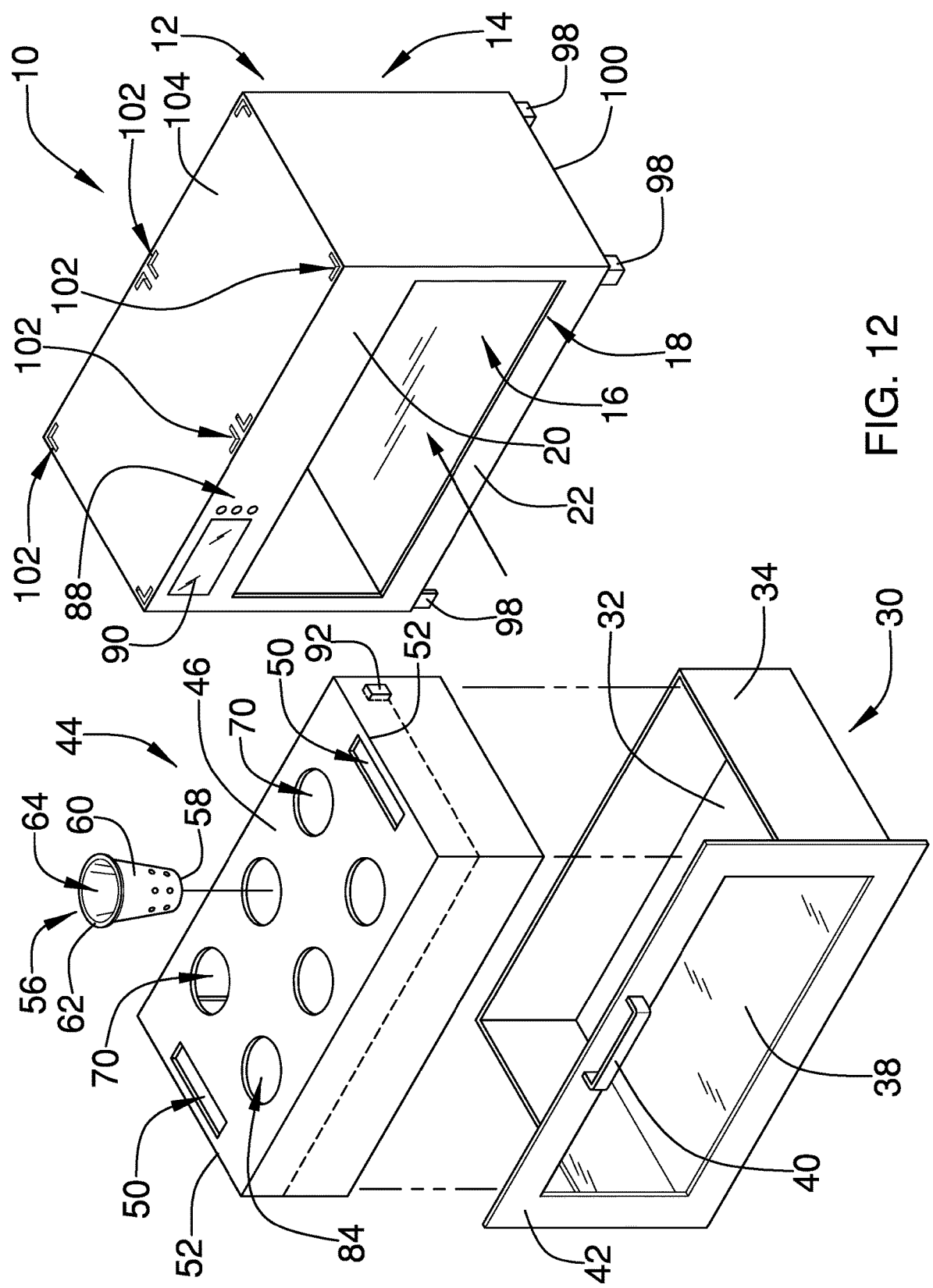
FIG. 12 is an exploded view of an alternative embodiment of the disclosure.

With reference now to the drawings, and in particular to FIGS. 1 through 12 thereof, a new plant growing system embodying the principles and concepts of an embodiment of the disclosure and generally designated by the reference numeral 10 will be described.

As best illustrated in FIGS. 1 through 12, the plant growing system 10 generally comprises a plurality of cabinet assemblies 12. Each cabinet assembly 12 of the plurality of cabinet assemblies 12 comprises a housing 14, a drawer 30, a support tray 44, and at least one plant pot 56. The housing 14 has an interior space 16 positioned in the housing 14 and a drawer opening 18 extending through a front side 20 of the housing 14 to the interior space 16. The housing 14 also has a reservoir 22 which is positioned below and is in fluid communication with the interior space 16. The reservoir 22 is configured for containing a volume of water 24. The drawer 30 is removably positioned in the interior space 16 and on a ledge 26 of the housing 14 that is positioned at a bottom 28 of the interior space 16. The drawer 30 is removable from the interior space 16 through the drawer opening 18. The drawer 30 has a base wall 32 and a perimeter wall 34, wherein the perimeter wall 34 is coupled to and extends upwardly from the base wall 32. The base wall 32 has a drainage hole 36 extending therethrough. At least a portion of a front section 38 of the perimeter wall 34 is translucent such that the front section 38 of the perimeter wall 34 is configured for facilitating viewing of objects through the front section 38. The drawer 30 also has a handle 40 which is coupled to an exterior surface 42 of the front section 38 of the perimeter wall 34.

The support tray 44 is removably positioned in the drawer 30. The support tray 44 has an upper wall 46 and at least one drainage opening 48 extending through the upper wall 46. The upper wall 46 has a pair of hand slots 50 extending therethrough, each of which is positioned adjacent to an associated one of a pair of lateral edges 52 of the upper wall 46 and has a size such that each hand slot 50 is configured for receiving a hand to facilitate gripping of the support tray 44. The support tray 44 also includes a plurality of support legs 54 coupled to and extending downwardly from the upper wall 46. The plurality of support legs 54 is positioned on the base wall 32 of the drawer 30 to space the upper wall 46 of the support tray 44 upwardly away from the base wall 32 of the drawer 30.

Each plant pot 56 of the at least one plant pot 56 is removably positioned on the support tray 44 and comprises a bottom wall 58, a peripheral wall 60, and a rim 62. The peripheral wall 60 is coupled to and extends upwardly from the bottom wall 58. The bottom wall 58 and the peripheral wall 60 bound a cavity 64 which is configured for containing a plant 66. The rim 62 is coupled to and extends outwardly from an upper edge 68 of the peripheral wall 60. The upper wall 46 of the support tray 44 has a plurality of planter holes 70 extending through the upper wall 46, each of which receives an associated one of the at least one plant pot 56 such that the rim 62 of the associated plant pot 56 is supported by the upper wall 46. The bottom wall 58 has a plurality of drainage orifices 72 extending through the bottom wall 58.

Each cabinet assembly 12 of the plurality of cabinet assemblies 12 further comprises a light emitter 74, a watering assembly 76, a control circuit 86, an input 88, a display 90, a water level sensor 92, and a drawer sensor 93. The light emitter 74 is configured to emit a light and is mounted in the housing 14 and is oriented to direct the light toward the at least one plant pot 56. The light emitter 74 may also define a heater for heating one or more of the support tray 44, the at least one plant pot 56, the plant 66 contained in each plant pot 56 of the at least one plant pot 56, and a volume of air positioned in the interior space 16. The watering assembly 76 is mounted in the housing 14 and is in fluid communication with the reservoir 22. The watering assembly 76 comprises a pump 78, a tubing 80, and at least one spray nozzle 82. The pump 78 is in fluid communication with the reservoir 22, and the tubing 80 is in fluid communication with the pump 78 and extends upwardly past the support tray 44. The at least one spray nozzle 82 is in fluid communication with the tubing 80. When activated, the pump 78 urges water 24 from the reservoir 22 through the tubing 80 and out of the at least one spray nozzle 82 to dispense the water 24 into the cavity 64 of each of the at least one plant pot 56.

In some embodiments, the support tray 44 has a chamber 84 positioned therein to contain the volume of water 24. In such embodiments, the watering assembly 76 may not be provided, and the at least one plant pot 56 is positioned at least partially in the chamber 84 so that the water 24 enters the cavity 64 of each of the at least one plant pot 56 through the plurality of drainage orifices 72 thereof to water 24 the plant 66 contained within the cavity 64.

The control circuit 86 is electrically coupled to the light emitter 74 and the watering assembly 76, and the input 88 is electrically coupled to the control circuit 86 to direct the control circuit 86 to selectively activate each of the light emitter 74 and the watering assembly 76. The control circuit 86 may be programmed to activate each of the light emitter 74 and the watering assembly 76 on a predetermined schedule, and the input 88 may be actuatable to select the predetermined schedule or set a user-defined schedule for operating the light emitter 74 and the watering assembly 76. The display 90 is mounted to an exterior 92 of the housing 14 and is electrically coupled to the control circuit 86. The display 90 may present menus for making selections via the input 88 and cabinet assembly data such as an amount of the volume of water 24 in the reservoir 22, a position of the drawer 30, and the like. A water level sensor 92 is mounted in the housing 14 and is electrically coupled to the control circuit 86. The water level sensor 92 is configured to detect the amount of the volume of water 24 in the reservoir 22. A drawer sensor 93 is electrically coupled to the control circuit 86 and is configured to detect when the drawer 30 is in a closed position 94 with respect to the housing 14. Each cabinet assembly 12 of the plurality of cabinet assemblies 12 may further comprise a power supply electrically coupled to the control circuit 86 or a means of electrically coupling the control circuit 86 to an external power source such as an electrical cord 96.

Each cabinet assembly 12 of the plurality of cabinet assemblies 12 further comprises a plurality of feet 98 coupled to and extending downwardly from a bottom surface 100 of the housing 14, and a plurality of slots 102 extending downwardly into a top surface 104 of the housing 14. The plurality of cabinet assemblies 12 is interchangeably stackable wherein at least one foot 98 of a first selected cabinet assembly 106 of the plurality of cabinet assemblies 12 is received into an associated slot 102 of the plurality of slots 102 of a second selected cabinet assembly 108 of the plurality of cabinet assemblies 12 when the first selected cabinet assembly 106 is positioned in a stacked configuration 110 with respect to the second selected cabinet assembly 108. The bottom surface 100 of the housing 14 of the first selected cabinet assembly 106 is supported on the top surface 104 of the housing 14 of the second selected cabinet assembly 108 when the first selected cabinet assembly 106 is positioned in the stacked configuration 110 with respect to the second selected cabinet assembly 108.

The plurality of cabinet assemblies 12 includes a pair of first-size cabinet assemblies 112 and a second-size cabinet assembly 114. The plurality of slots 102 of the second-size cabinet assembly 114 are arranged such that the first-size cabinet assemblies 112 are simultaneously positionable in the stacked configuration 110 with respect to the second-size cabinet assembly 114. The first size cabinet assemblies 12 are positioned laterally to each other when the first-size cabinet assemblies 112 are simultaneously positioned in the stacked configuration 110 with respect to the second-size cabinet assembly 114.

In use, the plurality of cabinet assemblies 12 may be stacked to form one or more stacked configurations 110 with respect to each other. The input 88 is actuated to select the predetermined schedule or set a user-defined schedule for operating the light emitter 74 and the watering assembly 76. When the watering assembly 76 pumps water 24 to the at least one plant pot 56, errant water 24 which does not reach the cavity 64 of each of the at least one plant pot 56 drains through the at least one drainage opening 48 of the support tray 44 into the drawer 30. Excess water 24 which is dispensed into the cavity 64 of each of the at least one plant pot 56, but which is not retained by the plant 66 or a quantity of soil 116 therein drains through the plurality of drainage orifices 72 of the bottom wall 58 of each of the at least one plant pot 56 into the drawer 30. Finally, water 24 which drains into the drawer 30 drains through the drainage hole 36 of the drawer 30 and returns to the reservoir 22. To remove the plant 66 of each of the at least one plant pot 56, the drawer 30 is opened, and the associated one of the at least one plant pot 56 is removed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plant growing system comprising at least one cabinet assembly, each cabinet assembly of the at least one cabinet assembly comprising:
   a housing having an interior space positioned in the housing, the housing having a drawer opening extending through a front side of the housing to the interior space;
   a drawer being removably positioned in the interior space, the drawer being removable from the interior space through the drawer opening;
   a support tray being removably positioned in the drawer;
   at least one plant pot being removably positioned on the support tray, each plant pot of the at least one plant pot being shaped such that each plant pot of the at least one plant pot is configured for containing a plant;
   a light emitter being configured to emit a light and being mounted in the housing and being oriented to direct the light toward the at least one plant pot;
   wherein the drawer has a base wall and a perimeter wall, the perimeter wall being coupled to and extending upwardly from the base wall, the base wall having a drainage hole extending therethrough, wherein at least a portion of a front section of the perimeter wall is translucent such that the front section of the perimeter wall is configured for facilitating viewing of objects through the front section;
   wherein the support tray has an upper wall, the upper wall having at least one drainage opening extending through the upper wall;
   wherein the upper wall has a pair of hand slots extending therethrough, each hand slot of the pair of hand slots being positioned adjacent to an associated one of a pair of lateral edges of the upper wall, each hand slot having a size such that each hand slot is configured for receiving a hand to facilitate gripping of the support tray;
   wherein the support tray includes a plurality of support legs being coupled to and extending downwardly from the upper wall, the plurality of support legs being positioned on the base wall of the drawer to space the upper wall of the support tray upwardly away from the base wall of the drawer;
   wherein each plant pot of the at least one plant pot of each cabinet assembly of the at least one cabinet assembly comprises:
      a bottom wall, the bottom wall having a plurality of drainage orifices extending through the bottom wall;
      a peripheral wall being coupled to and extending upwardly from the bottom wall, the bottom wall and the peripheral wall bounding a cavity, the cavity being configured for containing the plant; and
      a rim being coupled to and extending outwardly from an upper edge of the peripheral wall;
   wherein the upper wall of the support tray has a plurality of planter holes extending through the upper wall, each planter hole receiving an associated one of the at least one plant pot such that the rim of the associated plant pot is supported by the upper wall;
   wherein each cabinet assembly of the at least one cabinet assembly further comprises a watering assembly being mounted in the housing, the watering assembly being configured for pumping water to the at least one plant pot, the housing having a reservoir being positioned below and in fluid communication with the interior space, the reservoir being configured for containing a volume of water, the watering assembly comprising:
      a pump being in fluid communication with the reservoir;
      a tubing being in fluid communication with the pump and extending upwardly past the support tray; and
      at least one spray nozzle being in fluid communication with the tubing, the pump being configured to pump water from the reservoir through the tubing and out of the at least one spray nozzle to dispense the water into the cavity of each of the at least one plant pot;
   wherein each cabinet assembly of the at least one cabinet assembly further comprises:

a control circuit being electrically coupled to the light emitter and the watering assembly; and an input being coupled to the control circuit for controlling the control circuit to selectively activate each of the light emitter and the water assembly;

wherein each cabinet assembly of the at least one cabinet assembly further comprises a drawer sensor being electrically coupled to the control circuit, the drawer sensor being configured to detect when the drawer is in a closed position with respect to the housing;

wherein each cabinet assembly of the at least one cabinet assembly further comprises:

a plurality of feet being coupled to and extending downwardly from a bottom surface of the housing; and a plurality of slots extending downwardly into a top surface of the housing; and wherein the at least one cabinet assembly includes a plurality of cabinet assemblies, the plurality of cabinet assemblies being interchangeably stackable wherein at least one foot of a first selected cabinet assembly of the plurality of cabinet assemblies is received into an associated slot of the plurality of slots of a second selected cabinet assembly of the plurality of cabinet assemblies when the first selected cabinet assembly is positioned in a stacked configuration with respect to the second selected cabinet assembly; and wherein the plurality of cabinet assemblies includes a pair of first-size cabinet assemblies and a second-size cabinet assembly, wherein the plurality of slots of the second-size cabinet assembly are arranged such that the first-size cabinet assemblies are simultaneously positionable in the stacked configuration with respect to the second-size cabinet assembly.

2. The system of claim 1, wherein the housing has a ledge positioned at a bottom of the interior space, the interior space supporting the drawer.

3. The system of claim 1, wherein the drawer has a handle being coupled to an exterior surface of the front section of the perimeter wall.

4. The system of claim 1, wherein each cabinet assembly of the at least one cabinet assembly further comprises a display being mounted to an exterior of the housing and being electrically coupled to the control circuit.

5. The system of claim 1, wherein each cabinet assembly of the at least one cabinet assembly further comprises a water level sensor being mounted in the housing and being electrically coupled to the control circuit, the water level sensor being configured to detect an amount of the volume of water in the reservoir.

6. The system of claim 1, wherein the bottom surface of the housing of the first selected cabinet assembly being supported on the top surface of the housing of the second selected cabinet assembly when the first selected cabinet assembly is positioned in the stacked configuration with respect to the second selected cabinet assembly.

7. The system of claim 1, wherein the first size cabinet assemblies are positioned laterally to each other when the first-size cabinet assemblies are simultaneously positioned in the stacked configuration with respect to the second-size cabinet assembly.

8. A plant growing system comprising:

a plurality of cabinet assemblies, each cabinet assembly of the plurality of cabinet assemblies comprising:

a housing having an interior space positioned in the housing, the housing having a drawer opening extending through a front side of the housing to the interior space, the housing having a reservoir being positioned below and in fluid communication with the interior space, the reservoir being configured for containing a volume of water, the housing having a ledge positioned at a bottom of the interior space;

a drawer being removably positioned in the interior space, the drawer being removable from the interior space through the drawer opening, the drawer having a base wall and a perimeter wall, the perimeter wall being coupled to and extending upwardly from the base wall, the base wall having a drainage hole extending therethrough, the drawer being supported on the ledge of the housing, at least a portion of a front section of the perimeter wall being translucent such that the front section of the perimeter wall is configured for facilitating viewing of objects through the front section, the drawer having a handle being coupled to an exterior surface of the front section of the perimeter wall;

a support tray being removably positioned in the drawer, the support tray having an upper wall, the upper wall having at least one drainage opening extending through the upper wall, the upper wall having a pair of hand slots extending therethrough, each hand slot of the pair of hand slots being positioned adjacent to an associated one of a pair of lateral edges of the upper wall, each hand slot having a size such that each hand slot is configured for receiving a hand to facilitate gripping of the support tray, the support tray including a plurality of support legs being coupled to and extending downwardly from the upper wall, the plurality of support legs being positioned on the base wall of the drawer to space the upper wall of the support tray upwardly away from the base wall of the drawer;

at least one plant pot being removably positioned on the support tray, each plant pot of the at least one plant pot comprising:

a bottom wall, the bottom wall having a plurality of drainage orifices extending through the bottom wall;

a peripheral wall being coupled to and extending upwardly from the bottom wall, the bottom wall and the peripheral wall bounding a cavity, the cavity being configured for containing a plant; and a rim being coupled to and extending outwardly from an upper edge of the peripheral wall;

wherein the upper wall of the support tray has a plurality of planter holes extending through the upper wall, each planter hole receiving an associated one of the at least one plant pot such that the rim of the associated plant pot is supported by the upper wall;

a light emitter being configured to emit a light and being mounted in the housing and being oriented to direct the light toward the at least one plant pot;

a watering assembly being mounted in the housing and being in fluid communication with the reservoir, the watering assembly comprising:

a pump being in fluid communication with the reservoir;

a tubing being in fluid communication with the pump and extending upwardly past the support tray; and at least one spray nozzle being in fluid communication with the tubing, the pump being configured to pump water from the reservoir through the tubing and out of the at least one spray nozzle to dispense the water into the cavity of each of the at least one plant pot;

a control circuit being electrically coupled to the light emitter and the watering assembly;

an input being coupled to the control circuit for controlling the control circuit to selectively activate each of the light emitter and the water assembly;

a display being mounted to an exterior of the housing and being electrically coupled to the control circuit;

a water level sensor being mounted in the housing and being electrically coupled to the control circuit, the water level sensor being configured to detect an amount of the volume of water in the reservoir;

a drawer sensor being electrically coupled to the control circuit, the drawer sensor being configured to detect when the drawer is in a closed position with respect to the housing;

a plurality of feet being coupled to and extending downwardly from a bottom surface of the housing; and a plurality of slots extending downwardly into a top surface of the housing; and the plurality of cabinet assemblies being interchangeably stackable wherein at least one foot of a first selected cabinet assembly of the plurality of cabinet assemblies is received into an associated slot of the plurality of slots of a second selected cabinet assembly of the plurality of cabinet assemblies when the first selected cabinet assembly is positioned in a stacked configuration with respect to the second selected cabinet assembly, the bottom surface of the housing of the first selected cabinet assembly being supported on the top surface of the housing of the second selected cabinet assembly when the first selected cabinet assembly is positioned in the stacked configuration with respect to the second selected cabinet assembly, the plurality of cabinet assemblies including a pair of first-size cabinet assemblies and a second-size cabinet assembly, wherein the plurality of slots of the second-size cabinet assembly are arranged such that the first-size cabinet assemblies are simultaneously positionable in the stacked configuration with respect to the second-size cabinet assembly, the pair of first size cabinet assemblies being positioned laterally to each other when the first-size cabinet assemblies are simultaneously positioned in the stacked configuration with respect to the second-size cabinet assembly.

* * * * *